(12) United States Patent
Banks et al.

(10) Patent No.: US 7,978,717 B2
(45) Date of Patent: Jul. 12, 2011

(54) SYSTEMS AND METHODS FOR REDUCING POWER CONSUMPTION IN COMMUNICATION NETWORKS

(75) Inventors: Kevin Banks, Huntsville, AL (US); David B. Ewing, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 35 days.

(21) Appl. No.: 12/253,086

(22) Filed: Oct. 16, 2008

(65) Prior Publication Data

US 2010/0098102 A1  Apr. 22, 2010

(51) Int. Cl.
*H04L 12/28* (2006.01)
*H04L 12/56* (2006.01)
*H04B 7/212* (2006.01)
*G08C 17/00* (2006.01)

(52) U.S. Cl. ......... 370/406; 370/311; 370/324; 455/507

(58) Field of Classification Search .......... 370/254–315, 370/328–338, 401–406; 455/458–550; 709/220–227
See application file for complete search history.

(56) References Cited

U.S. PATENT DOCUMENTS

| | | | | |
|---|---|---|---|---|
| 5,440,556 A * | 8/1995 | Edem et al. | ................... | 370/465 |
| 6,346,873 B1 * | 2/2002 | Suzuki et al. | ................ | 340/3.41 |
| 6,633,577 B1 * | 10/2003 | Nyu | ............................... | 370/416 |
| 6,774,766 B1 * | 8/2004 | Moyer | ........................ | 340/10.32 |
| 7,231,221 B2 * | 6/2007 | Assarsson et al. | ............. | 455/458 |
| 7,260,068 B2 * | 8/2007 | Hsieh et al. | .................... | 370/311 |
| 7,274,907 B1 * | 9/2007 | Perotti et al. | .................. | 455/11.1 |
| 7,394,782 B2 * | 7/2008 | Davis | ............................ | 370/324 |
| 7,471,651 B2 * | 12/2008 | Mahany et al. | ............... | 370/310 |
| 7,496,059 B2 * | 2/2009 | Yoon | .............................. | 370/311 |
| 7,680,520 B2 * | 3/2010 | Ruuska et al. | ................ | 455/574 |
| 2005/0064818 A1 | 3/2005 | Assarsson et al. | | |
| 2006/0014536 A1 | 1/2006 | Demirhan et al. | | |
| 2006/0099980 A1 | 5/2006 | Nielsen et al. | | |
| 2006/0128349 A1 | 6/2006 | Yoon | | |
| 2006/0291408 A1 | 12/2006 | Huang et al. | | |

* cited by examiner

*Primary Examiner* — Man Phan
(74) *Attorney, Agent, or Firm* — Lanier Ford Shaver & Payne, P.C.; Jon E. Holland (57) ABSTRACT

The present disclosure generally relates to systems and methods for reducing power consumption in communication networks. In one exemplary embodiment, a system includes a leader node in communication with a plurality of follower nodes. The leader node causes the leader and follower nodes to transition from an awake mode to a sleep mode where they consume less power. An exemplary embodiment of a method includes the steps of configuring nodes in a communication network as follower nodes and configuring a node in the communication network as a leader node. The leader node is configured to cause the leader and follower nodes to alternate between an awake mode and a sleep mode. The leader and follower nodes consume less power when in the sleep mode than when in the awake mode.

14 Claims, 5 Drawing Sheets

SYSTEMS AND METHODS FOR REDUCING POWER CONSUMPTION IN COMMUNICATION NETWORKS

RELATED ART

Communication networks, such as wireless mesh communication networks, are known in the art. These types of networks typically include multiple nodes that can send, receive, and route communications from one node to another and can be used in a variety of different applications. For example, communication networks can be used to monitor and control the temperature in various rooms in a building. Alternatively, the networks could be used to control lighting in these rooms.

Regardless of the application, communication networks must be supplied with power and this can be accomplished in one of several ways. For example, in some applications, the network is powered using external power, i.e. each node is connected to an external power supply such as a building wall outlet. In other applications, however, external power is unavailable, and each node in the network is powered using batteries.

Communication networks employing battery-powered nodes can be expensive and time consuming to maintain and operate. Batteries run down and must be replaced. Replacing batteries over time can be expensive, particularly in networks with hundreds of nodes requiring hundreds of batteries. In addition, the time and cost of having someone actually replace the batteries in each node adds up over time.

Externally-powered communication networks do not suffer from this disadvantage because they do not include batteries that must be replaced. Nevertheless, these types of networks do usurp electrical power from external sources at some cost.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to systems and methods for reducing power consumption in communication networks, such as wireless mesh communication networks. In one exemplary embodiment, a system includes a plurality of follower nodes in communication with a leader node. The leader node is operable to cause the leader node and the plurality of follower nodes to transition from an awake mode, during which the leader node and the plurality of follower nodes consume a certain amount of power, to a sleep mode, during which the leader node and the plurality of follower nodes consume less power than when in the awake mode. An exemplary embodiment of a method of reducing power consumption in a communication network includes the steps of configuring a plurality of nodes in a communication network as follower nodes and configuring a node in the communication network as a leader node, the leader node being operable to cause the leader node and the plurality of follower nodes to alternate between an awake mode and a sleep mode, the leader node and the plurality of follower nodes consuming less power when in the sleep mode than when in the awake mode.

Figure 1:
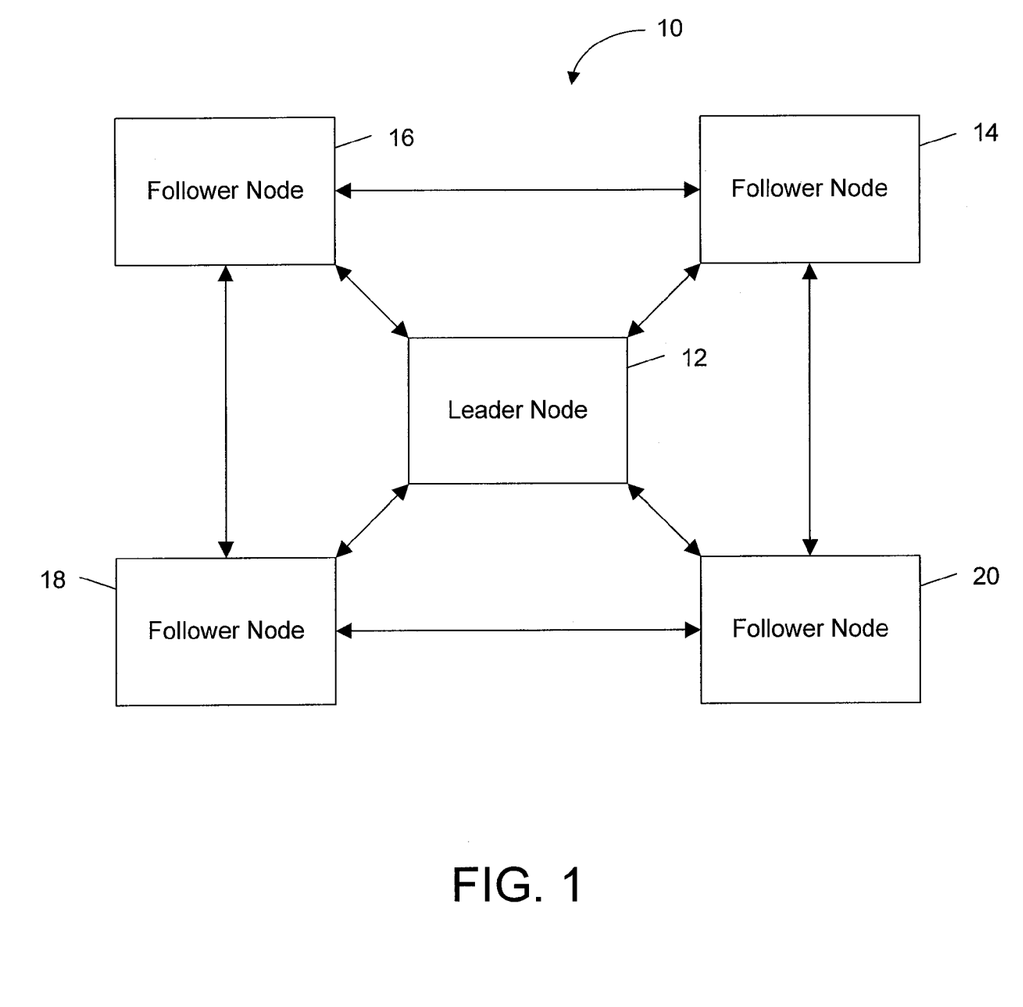
FIG. 1 is a block diagram illustrating an exemplary embodiment of a system for reducing power consumption in a communication network.

An exemplary embodiment of a system 10 for reducing power consumption in a communication network is shown in FIG. 1. The system 10 includes a leader node 12 in communication with a plurality of follower nodes 14, 16, 18, and 20. Exemplary configurations and communication techniques for nodes of a communication network are described in U.S. patent application Ser. No. 12/114,566, entitled "Systems and Methods for Dynamically Configuring Node Behavior in a Sensor Network," and filed on May 2, 2008, which is incorporated herein by reference.

The leader and follower nodes may communicate wirelessly or using physical connections. The leader and follower nodes may form any one of a variety of known communication networks, including mesh and star communication networks. The leader and follower nodes may be powered using an external power source, such as a building wall outlet, or batteries.

The leader node 12 is operable to cause the leader node and the follower nodes to switch between an awake mode and a sleep mode from time-to-time. During the awake mode, the leader and follower nodes can send, receive, and route communications (although communication is not guaranteed for a variety of reasons, including radio interference, bad connections, etc.). During the sleep mode, the leader and follower nodes cannot send, receive, and route communications but consume less power than when in the awake mode. In some embodiments, the leader node 12 only causes a subset of the follower nodes (e.g., follower nodes 14 and 16 but not follower nodes 18 and 20) to switch between the awake mode and the sleep mode.

In one exemplary embodiment, the leader and follower nodes turn off communication modules (such as communication modules 30 and 44 shown in FIGS. 2 and 3) and/or other components (such as processing element 22 and 36 shown in FIGS. 2 and 3) of these nodes in order to reduce power consumption when they transition to the sleep mode.

The leader and follower nodes may be synchronized so that they all transition back and forth between the awake mode and sleep mode at substantially the same time. These nodes may be synchronized by configuring the leader node to send at least one sleep command to the follower nodes that causes the follower nodes to transition to and remain in the sleep mode for a specified sleep period, and configuring the leader node and the follower nodes to automatically transition back to the awake mode after the specified sleep period.

For example, the leader node may be configured to broadcast or otherwise transmit sleep commands to the follower nodes every 7 seconds that instruct the follower nodes to sleep for 5 seconds. Each time a sleep command is received by a follower node, the follower node transitions from the awake mode to the sleep mode for 5 seconds. After each 5 second sleep period, the follower node automatically transitions back to the awake mode and sends, receives, and/or routes network messages until it receives the next sleep command, which arrives 2 seconds later.

Alternatively, the leader node may be configured to send a single sleep command to the follower nodes that instructs the follower nodes to sleep for a certain amount of time and then wake up, i.e., a command that causes the follower nodes (and the leader node) to enter a periodic sleep cycle. In still another exemplary embodiment, the leader node may be configured to send a sleep command that provides the follower nodes with information regarding when to expect to receive another sleep command. Even if the follower nodes are aware of when to expect a sleep command, the sending of the sleep command to initiate a transition to a sleep state helps to synchronize the sleep state transitions.

As an example, assume that the leader node informs the follower nodes that a transition to a sleep state is to occur every seven seconds, as described in the example described above. Due to timing variations between the nodes, some of the nodes may expect the same sleep cycle to commence at different times. Thus, if each follower node transitions to the sleep state for a particular sleep cycle based exclusively on its own timing, some of the follower nodes may transition to a sleep state at different times relative to the other nodes.

In one exemplary embodiment, the leader node broadcasts a sleep command as a multicast message to the follower nodes, although the sleep command may be another type of message in another embodiment. The communication of multicast messages is described in U.S. Provisional Patent Application No. 61/105,692, entitled "Systems and Methods for Controlling Wireless Sensor Networks," and filed on Oct. 15, 2008, which is incorporated herein by reference. As described in U.S. Provisional Patent Application No. 61/105,693, when a node receives a multicast message, the message is generally rebroadcast by the receiving node so that the message is communicated through the network to nodes that are not in direct communication with the original transmitting node. In this way, the multicast message can be received by each node in the network even if all of the nodes are not in range of the original transmitting node. The multicast message includes a value, referred to as a "time-to-live value," which is decremented by each receiving node before such receiving node rebroadcasts the message. Once the time-to-live value is decremented below a predefined threshold, referred to as the "time-to-live threshold" or "TTL threshold," rebroadcast of the multicast message is stopped. In this regard, if the time-to-live value is below the TTL threshold, then the receiving node refrains from rebroadcasting the message thereby preventing the multicast message from being continually rebroadcast through the network. Other techniques for limiting the life of a multicast message are possible.

Accordingly, when the sleep command in the instant example is received by a follower node, the follower node rebroadcasts the message (assuming that the time-to-live value of the sleep command is above the predefined threshold) and then automatically transitions to a sleep state in response to the sleep command. Rebroadcasting of the message enables other nodes, if any, that are not within range of the leader node to receive the sleep command. Moreover, the sleep command ripples through the network hopping from one node to another until each node has received the sleep command and transitions to a sleep state.

Thus, in response to the sleep command, the follower nodes transition to a sleep state at substantially the same time. Note that the term "substantially" recognizes that there may be slight delays, such as communication and processing delays, that may cause the nodes to transition to the sleep state at slightly different times. For example, follower nodes that are a greater number of hops from the leader node may receive the sleep command slightly after other follower nodes that are closer to the leader node. Nevertheless, for any given sleep cycle, the use of the sleep command to control the timing of sleep state transitions likely decreases the timing differences of such transitions among the nodes relative to an embodiment in which each node asynchronously transitions to a sleep state based on its own timing. Note that the leader node may be configured to automatically transition to a sleep state after transmitting the sleep command.

In addition, the sleep command may have various information used by the follower nodes. For example, in one exemplary embodiment, the sleep command has a header that indicates a message type of the sleep command and that includes information, such as an identifier of the network, used by the follower nodes to route the message through the network. Further, the sleep command may include payload data indicating various characteristics of the sleep state. For example, the sleep command may include a value indicative of the duration for the sleep state. Before transitioning to a sleep state in response to the sleep command, the follower node may appropriately set parameters within the node such that it automatically awakens based on such value in the sleep command. In addition, the sleep command may include a value indicating when the next sleep command is to be expected by the receiving node. For example, the sleep command may indicate that the sleep state is to last for 5 seconds and the next sleep command is to be received in seven seconds. However, as further described herein, the sleeping characteristics may be defined prior to the broadcast of the sleep command such that the sleep command used to put the node to sleep does not need to include any data indicative of the sleeping characteristics. Further, in one exemplary embodiment, sleeping characteristics are predefined but may be updated, when desired, by information in the sleep command.

Figure 2:
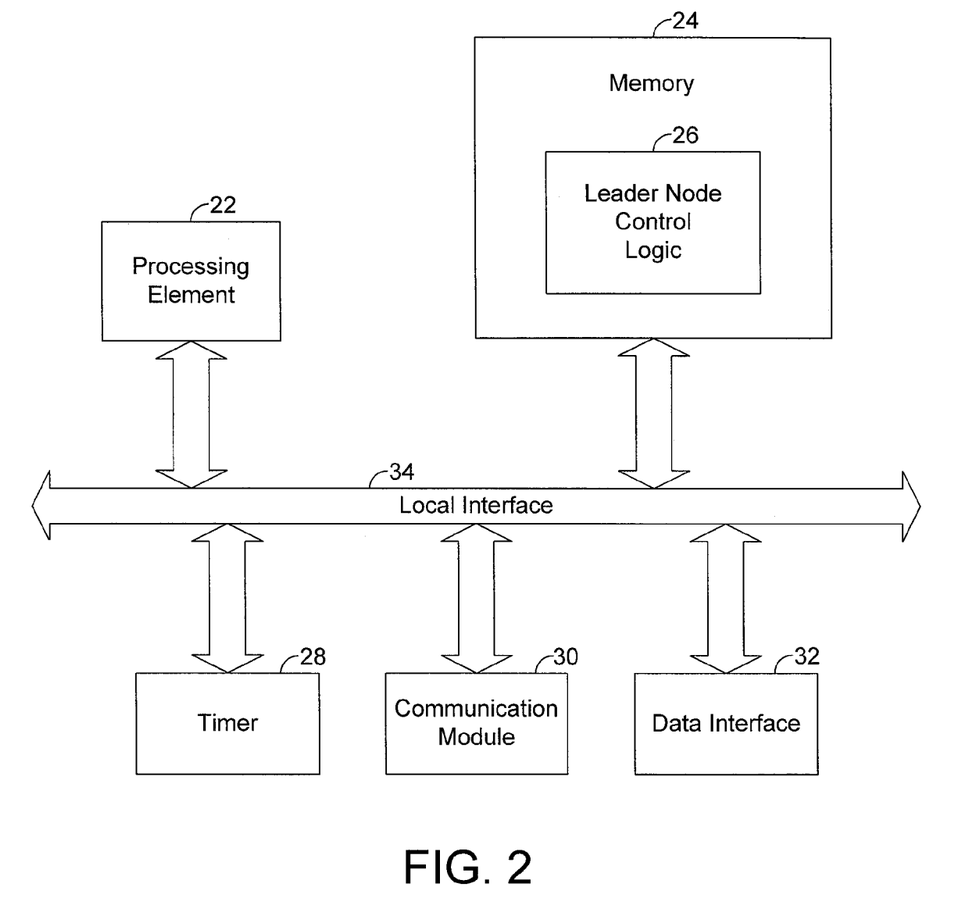
FIG. 2 is a block diagram illustrating an exemplary embodiment of a leader node depicted in FIG. 1.
Figure 3:
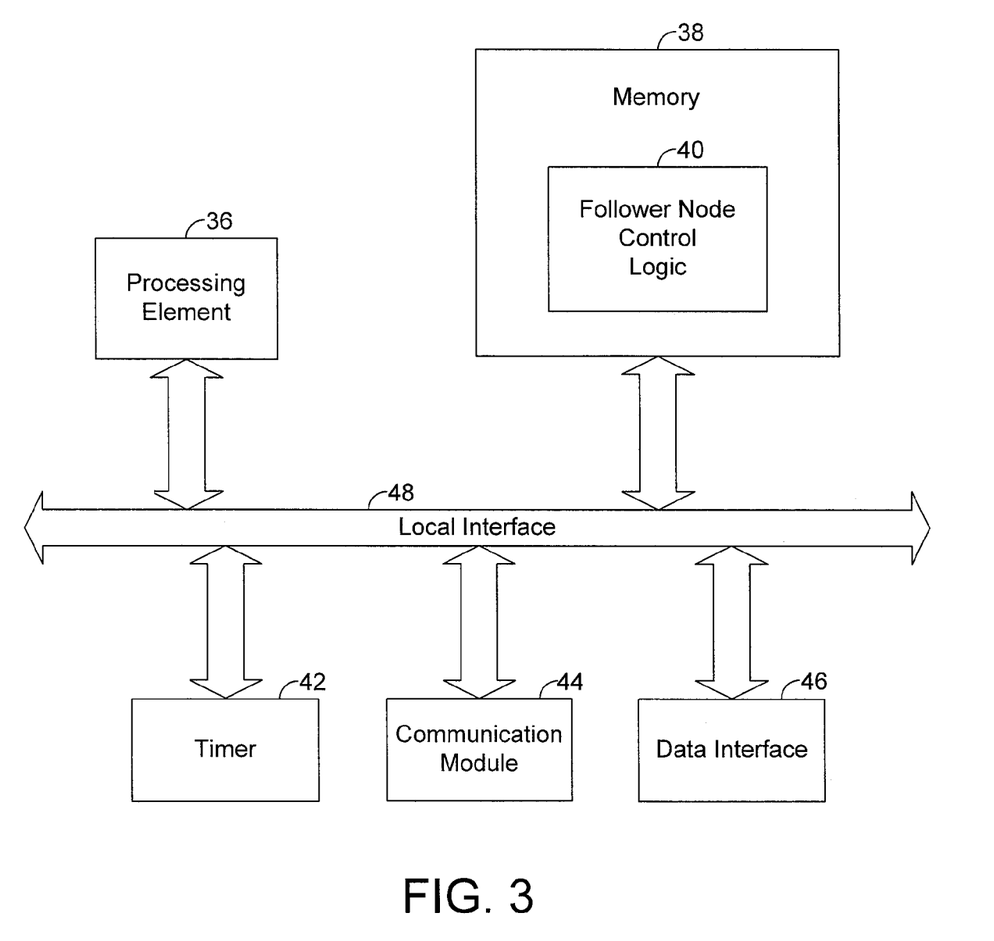
FIG. 3 is a block diagram illustrating an exemplary embodiment of a follower node depicted in FIG. 1.

The leader and follower nodes may be configured to perform their respective functions using software, firmware, hardware, or any combination thereof. For example, the nodes may be configured by connecting the nodes to a personal computer and downloading software to the nodes that causes them to perform their respective functions using hardware included in the nodes. Example configurations for the leader and follower nodes configured in this manner are shown in FIGS. 2 and 3 and described in more detail below.

The leader node and follower nodes may be configured so that the sleep and/or awake periods can be varied for different sleep cycles to increase or decrease power consumption by the leader and follower nodes as may be desired. If the sleep period is increased, the leader and follower nodes remain in the sleep mode for a longer time period and, as a result, consume less power. If the sleep period is decreased, the leader and follower nodes remain in the sleep mode for a shorter period of time and consume more power.

The follower nodes may be configured to automatically elect a leader node at various times. For example, a network that is initially configured with only follower nodes may automatically elect an initial leader node. In addition, a network that already has a leader node may elect a replacement leader node due to the existing leader node becoming inoperable for some reason, i.e., unable to communicate or otherwise fulfill the responsibilities of the leader node. There are various techniques that may be used by the follower nodes to discover when the leader node is inoperable. For example, a follower node may discover that the leader node is inoperable when the leader node does not acknowledge messages transmitted from the follower node to the leader node. A follower node may also discover that the leader node is inoperable when the follower node does not receive a sleep command when expected. As described above, the follower nodes may be aware of approximately when they are supposed to be in the awake mode and the sleep mode, and likewise know when they should receive a sleep command from the leader node. For example, the leader node may inform the follower nodes of when to expect sleep commands. If a sleep command is not received as expected, one of the follower nodes initiates an election process by nominating itself as the new or replacement leader node and sending this information to the other follower nodes. In one exemplary embodiment, a follower node initiating an election (referred to herein as an "initiating follower node") nominates itself by broadcasting or otherwise transmitting a nomination message to the other follower nodes. In one exemplary embodiment, the nomination message is a multicast message, but the nomination message may be another type of message in another embodiment.

The nomination message includes information indicating that the initiating follower node has nominated itself as the new leader node and information regarding the initiating follower node (such as a unique identifier discussed in more detail below) that can be used by the other follower nodes to determine if they should be the new leader node instead of the initiating follower node. When the other follower nodes receive this information, each one checks to see if it should be the new leader node and, if so, nominates itself as the new leader node. In one exemplary embodiment, the other follower nodes check to see if they should be the new leader node by comparing unique identifiers associated with the initiating follower node and each of the other follower nodes. The other follower nodes nominate themselves in the same manner as the initiating follower node, that is, by broadcasting and/or multicasting a new nomination message to the other follower nodes. If another follower node subsequently determines that it should be the new leader node, then it nominates itself as the new leader node and the previously nominated follower node is demoted back to being a follower node. This process continues until each follower node has determined whether it should be the new leader node and the new leader node is elected.

The follower nodes may be further configured so that any one of the follower nodes can initiate the election process and that certain follower nodes can never become leader nodes. For example, depending on the configuration of the network, a particular follower node may be within range of only a small number (e.g., one) of the other nodes of the network. It may be desirable to have other nodes that are within range of a greater number of nodes to serve as the leader node so that sleep commands can be broadcast more efficiently. Accordingly, it may be desirable to configure a follower node, such as a follower node within range of only a small number of other nodes, so that it can never be the leader node in order to ensure that any elected new leader node can more easily communicate with the follower nodes in the network. The foregoing can be achieved in a variety of ways. In one embodiment, each node has a control setting that controls whether the node can server as a leader node. Such control setting is stored in memory and can be set and/or updated by a user. If the control setting indicates that the node cannot serve as a leader node, then the node does not nominate itself as the leader. Accordingly, only the other nodes that are allowed to serve as the leader nominate themselves as the leader. Nodes that are allowed to serve as the leader node shall be referred to herein as "leader-enabled."

In one exemplary embodiment, each node has an indicator, referred to hereafter as the "leader indicator," indicating whether the node is the leader node or a follower node. For example, the leader indicator may be a one bit data value, but other types of indicators are possible in other examples. If the leader indicator indicates that the node is the leader, then it fulfills the responsibilities of the leader node, as described herein. For example, the node may initiate the broadcast of sleep commands, as described herein. If the leader indicator does not indicate the node to be the leader, then the node refrains from initiating sleep commands and instead responds to sleeps commands from the leader node as appropriate.

The follower nodes may still further be configured so that an election process initiated by a follower node ends due to a timeout. For example, each follower node may be configured so that, when it receives an initial nomination message of an election, an "end-of-election" timeout is started in the node. If the node, referred to hereafter as the "receiving node," that receives the initial nomination message decides not to nominate itself as the leader, then the receiving node ensures that its leader indicator is updated to indicate that it is not the leader, and the receiving node rebroadcasts the initial nomination message assuming that the time-to-live value is above the TTL threshold. If the receiving node decides to nominate itself as the leader, then the receiving node broadcasts a new nomination message rather than rebroadcasting the initial nomination message. The receiving node also updates its leader indicator to indicate that it is now the leader. If the receiving node later receives another nomination message having a lower MAC address, the receiving node changes its leader indicator to indicate that it is no longer the leader.

Regardless of whether or not the receiving node nominates itself as the leader, the receiving node monitors the end-of-election timeout after receiving the initial nomination message and starting such timeout. If the receiving node receives another nomination message after initiating the end-of-election timeout but before expiration of such timeout, then the receiving node restarts the end-of-election timeout thereby extending the time at which the timeout would otherwise have expired. Eventually, however, a point should be reached such that the receiving node does not receive a new nomination message that restarts the end-of-election timeout before such timeout expires. When the end-of-election timeout eventually expires, the receiving node determines that the election process has ended. Thus, the receiving node begins normal operation as either the leader node or a follower node depending on its leader indicator. The node elected by the election process as the leader should have its leader indicator appropriately set to indicate that it is now the leader. Based on such indicator, the leader node is configured to synchronize sleep cycle transitions by transmitting sleep command as described herein.

The determination of which node should be the new leader node during an election may be based on unique identifiers associated with each follower node, although other techniques may be used as well. For example, each follower node may have a unique network address, such as a Media Access Control (MAC) address, and the follower nodes may be configured so that the follower node with the lowest MAC address becomes the new leader node. In other embodiments, the selection of the leader node may be based on other criteria. For illustration purposes, assume hereafter that the leader-enabled node with the lowest MAC address is selected as the leader node. In this type of exemplary embodiment, an election might proceed as follows.

Initially, the leader indicator of each of the follower nodes is set to indicate that the node is not the leader, and the leader indicator of the leader node is set to indicate that it is the leader. For illustrative purposes, assume that the leader indicator of a node, when asserted, indicates that the node is the leader, and assume that the leader indicator, when deasserted, indicates that the node is a follower node. Further, assume that the leader node becomes inoperable such that it cannot communicate with any of the follower nodes.

Figure 4:
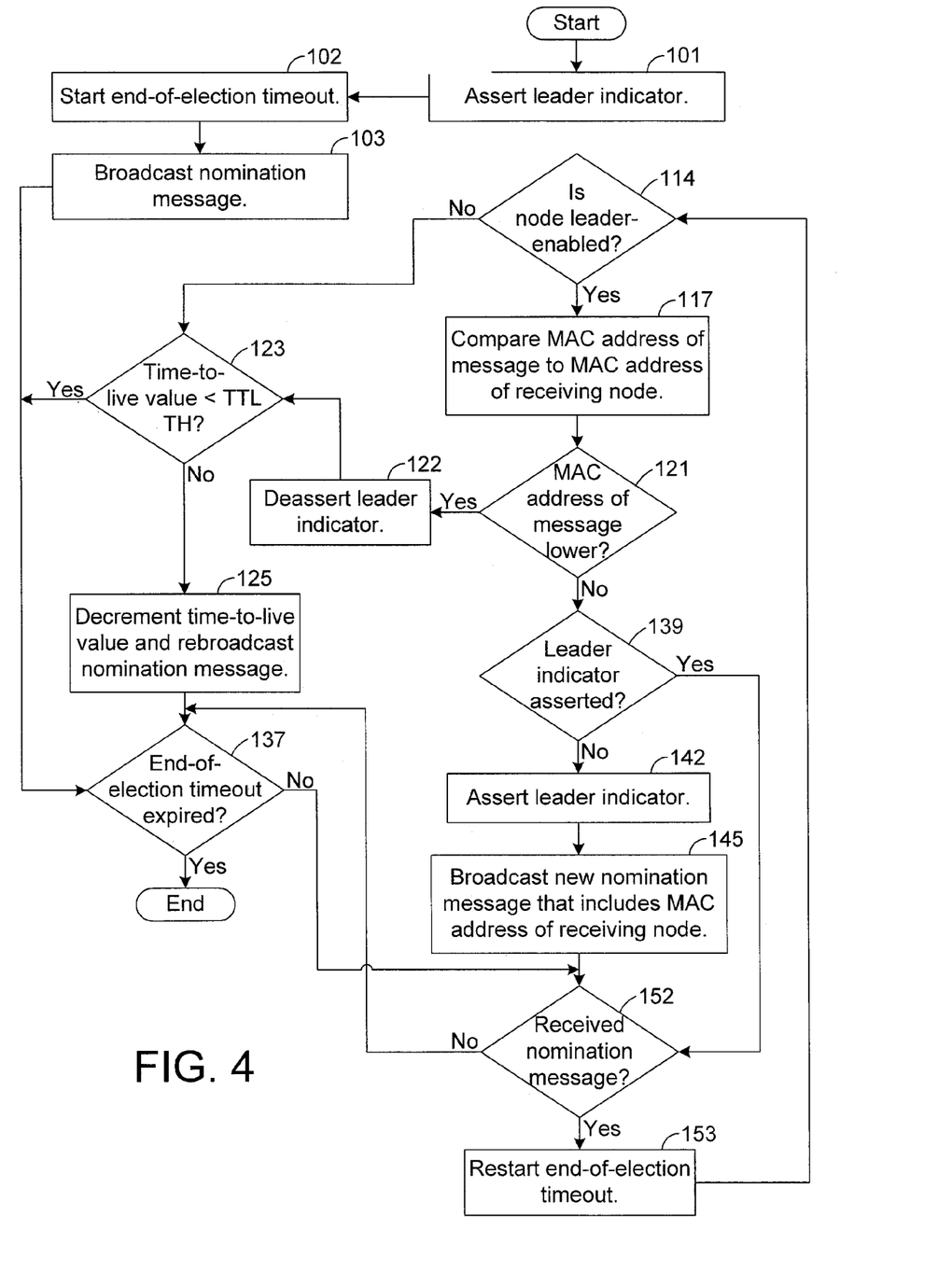
FIG. 4 is a flow chart illustrating an exemplary method for an initiating follower node in an election to determine a leader node.
Figure 5:
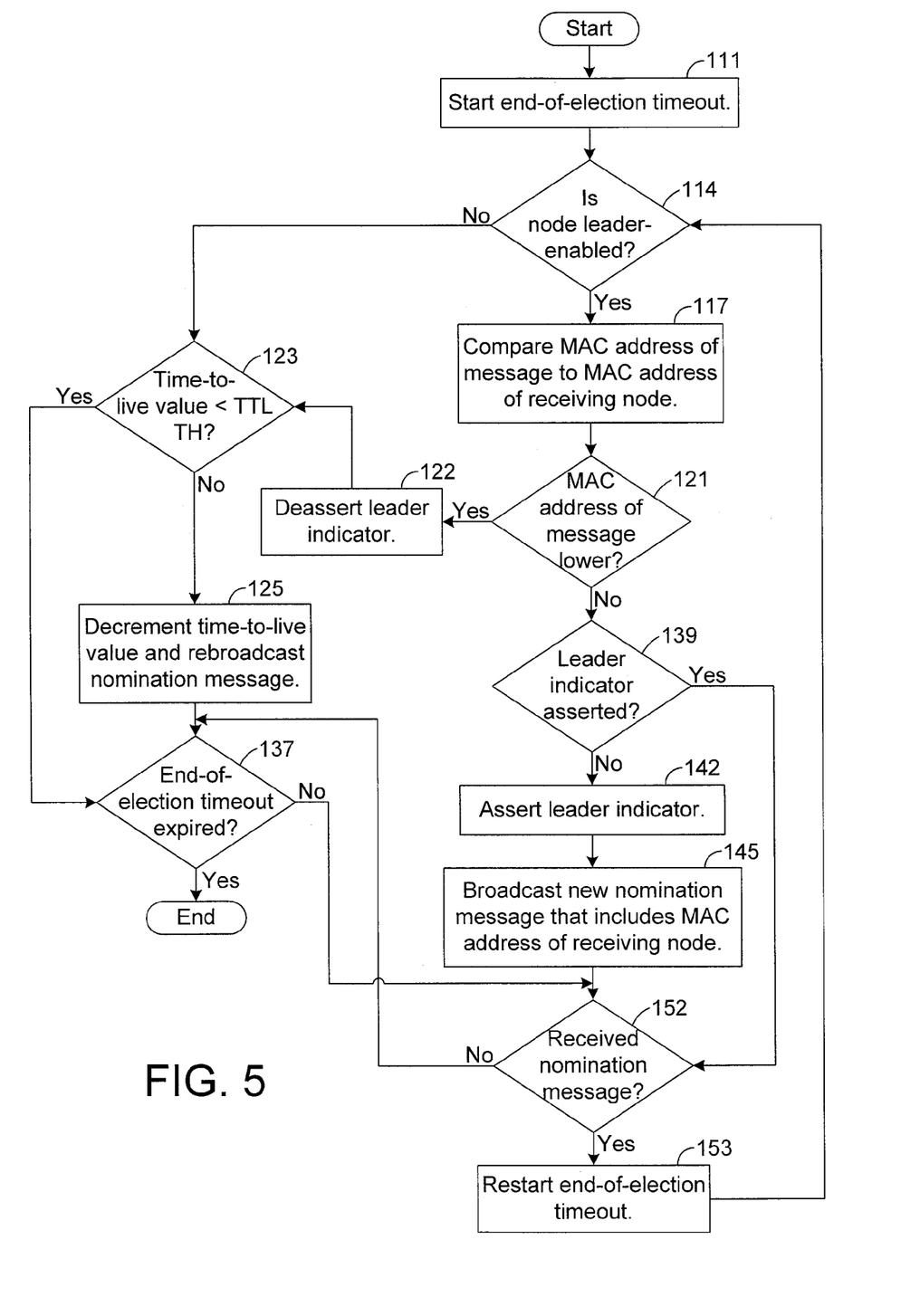
FIG. 5 is a flow chart illustrating an exemplary method for a follower node in an election to determine a leader node.

One of the follower nodes, referred to hereafter as the "initiating follower node," determines that the leader node is inoperable based on the fact that a sleep command has not been received as expected. FIG. 4 depicts an exemplary method implemented by the initiating follower node after such node has determined that the leader node is inoperable and that an election of a new leader node should commence. As shown by blocks 101 and 102 of FIG. 4, the initiating follower node sets its leader indicator to indicate that it is the leader, and the initiating follower node starts its end-of-election timeout. The initiating follower node also broadcasts a nomination message to the other follower nodes indicating that it nominates itself as the new leader node and includes its MAC address in the nomination message, as shown by block 103. Each of the other follower nodes that receives the nomination message from the initiating follower node compares the MAC address for the initiating follower node with its own MAC address and determines if it has a lower MAC address. An exemplary method implemented by the follower nodes after receiving an initial nomination message of the election is shown by FIG. 5.

If none of the other follower nodes has a MAC address that is lower than the MAC address of the initiating follower node, then none of the other follower nodes nominates itself as the leader node. In this regard, upon receiving the nomination message from the initiating follower node, the receiving node starts its end-of-election timeout, as indicated by block 111 of FIG. 5. The receiving node also determines whether it is leader-enabled, as shown by block 114. If the receiving node is leader-enabled, then the node compares its MAC address to the one in the nomination message, as shown by block 117. If the MAC address of the message is lower, then the receiving node does not nominate itself as the leader. Instead, the receiving node deasserts its leader indicator and checks the time-to-live value in the nomination message, as shown by blocks 121-123. If the time-to-live value is above the TTL threshold (TH), then the receiving node decrements the time-to-live value in the nomination message and rebroadcasts such message, as shown by block 125. If none of the follower nodes has a MAC address lower than that of the initiating follower node, then the end-of-election timeout expires without any new nomination messages being generated by any of the nodes. Thus, the receiving node in the instant example eventually makes a "yes" determination in block 137 and begins normal operation as a follower node.

If, however, the receiving node has a MAC address that is lower than the MAC address for the initiating follower node, then the receiving node checks its leader indicator to determine whether it is the leader prior to receiving the nomination message, as shown by block 139. If so, the receiving node discards the nomination message without rebroadcasting it or broadcasting a new nomination message. However, if the receiving node is not currently the leader, then the receiving node asserts its leader indicator to indicate that it is the leader, as shown by block 142. Also, rather than rebroadcasting the nomination message from the initiating follower node, the receiving node broadcasts its own nomination message indicating that it has nominated itself as the new leader node and providing its MAC address in the nomination message, as shown by block 145.

If another nomination message is received by the receiving node, then the receiving node restarts its end-of-election timeout, as shown by blocks 152 and 153. Also, the receiving node repeats the aforementioned process.

As can be seen by comparing FIGS. 4 and 5, the initiating follower node operates similar to the other follower nodes once it has initiated an election by broadcasting the first nomination message of the election. Note that if at least one of the follower nodes does nominate itself as the leader, then the initiating follower node, which originally nominated itself as the leader, eventually receives a nomination message with a lower MAC address. Thus, the initiating follower node updates its leader indicator in block 122 of FIG. 4 to indicate that it is a follower node.

Once the leader-enabled node with the lowest MAC address has broadcast a nomination message nominating itself as the leader, the other nodes eventually receive the message, deassert their leader indicators, and stop broadcasting nomination messages. Accordingly, the end-of-election timeout for each node eventually expires marking the end of the election. Thus, at the conclusion of the election, the node with the lowest MAC address should have its leader indicator asserted, and the leader indicators of the other nodes should be deasserted. In this regard, the election ends with the leader-enabled node having the lower MAC address elected as the leader node.

It should be emphasized that the methods shown by FIGS. 4 and 5 are exemplary, and changes to the methods are possible. As an example, in one exemplary embodiment, blocks 123 and 125 are performed upon receipt of a nomination message and before the MAC address of the message is compared to that of the receiving node. For example, within each node, there may be logic, referred to herein as "core logic," that is configured to process multicast messages in the same way upon reception (e.g., rebroadcast multicast messages depending on the time-to-live values in such messages) regardless of the message type. Other logic, such as a script written by a user, may then be configured to determine the message type (e.g., identify the received message as a nomination message) and handle the message based on the determined message type. In such an embodiment, if the time-to-live value of the received nomination message is above the TTL threshold, then the received message is rebroadcast by the core logic. Thereafter, the MAC address of the receiving node is compared to the MAC address in the received nomination message. If the MAC address of the receiving node is less than the MAC address in the message, then the receiving node broadcasts a new nomination message for nominating the receiving node as the leader. In such an embodiment, both a rebroadcast of the nomination message and a broadcast of a new nomination message occur in response to the received nomination message.

In yet other embodiments, steps may be added to the described methods, and it is possible for steps shown by the described methods to not be performed. Further, the described steps may be rearranged and performed in an order other than the one shown by FIGS. 4 and 5.

Note that it is possible for multiple nodes to believe that they have been elected as the new leader node. In particular, the leader indicator for multiple nodes may be asserted at the end of an election. For example, an initiating follower node may broadcast or otherwise transmit a nomination message that is received by a second follower node, which then determines that it should be the new leader node and broadcasts or otherwise transmits a new nomination message. If this new nomination message is not received by the initiating follower node (because of interference or some other reason), both the initiating follower node and the second follower node will believe that they are the new leader node. To address this situation, each node may be configured to automatically revert from being a leader node to a follower node if the node receives a sleep command originally transmitted by another node. Thus, when one of the leader nodes sends out a sleep command, any of the other nodes believing itself to be the new leader node automatically reverts to being a follower node regardless of whether its MAC address is lower than that of the node that transmitted the sleep command. Other techniques for reconciling a situation in which multiple nodes believe themselves to be the leader are possible.

In one exemplary embodiment, the election process is only initiated after a predetermined grace period. For example, as indicated above, the follower nodes may be configured to know approximately when to expect to receive a sleep command from a leader node. The follower nodes may be further configured to wait a predetermined amount of time (the predetermined grace period) after the time they were expecting to receive a sleep command before they initiate the election process to elect a new leader node.

The leader node may be configured to notify an external device (such as another node that is not participating in the sleep cycle being followed by a communication network) in communication with the communication network formed by the leader node and the follower nodes that the network is awake and, as a result, can send, receive, and/or route communications. This may be accomplished by configuring the leader node so that it sends a "network up" notification to the external device each time the leader and follower nodes transition back from the sleep mode to the awake mode. This allows the external device to discover when it can communicate with the communication network formed by the leader and follower nodes.

In one exemplary embodiment, as shown in FIG. 2, the leader node 12 includes a processing element 22, memory 24, leader node control logic 26, a timer 28, a communication module 30, and a data interface 32, all of which are connected to a local interface 34. The processing element 22 may be a digital signal processor (DSP), microprocessor, microcontroller, or a central processing unit (CPU). The processing element 22 communicates with and drives the other components in the leader node using the local interface 34, which may include at least one bus. The leader control logic 26 controls the operation of the leader node 12 and can be implemented in software, firmware, hardware, or any combination thereof. In the exemplary embodiment shown in FIG. 2, the leader control logic 26 is implemented in software and stored in the memory 24.

The timer 28 allows the leader node to determine when to cause the follower nodes to transition to the sleep mode. The communication module 30 allows the leader node to communicate with the follower nodes. In some embodiments, the communication module 30 is a wireless communication module. For example, the communication module 30 may comprise a wireless transceiver, such as a radio frequency (RF) transceiver, and a network stack. In one exemplary embodiment, the communication module 30 implements the network protocols for communicating messages throughout the network formed by the leader and follower nodes. The data interface 32, such as a RS232 or USB port, allows the leader node to communicate with an external device, such as a personal computer.

In one exemplary embodiment, referring to FIG. 3, each one of the follower nodes includes a processing element 36, memory 38, follower node control logic 40, a timer 42, a communication module 44, and a data interface 46, all of which are connected to a local interface 48. The processing element 36 may be a digital signal processor (DSP), microprocessor, microcontroller, or a central processing unit (CPU). The processing element 36 communicates with and drives the other components in the follower node using the local interface 48, which may include at least one bus. The follower node control logic 40 controls the operation of the follower node and can be implemented in software, firmware, hardware, or any combination thereof. In the exemplary embodiment shown in FIG. 3, the follower node control logic 40 is implemented in software and stored in the memory 38.

The timer 42 allows the follower node to determine when to initiate the election process for electing a new leader node if a sleep command is not received as expected by the follower node. The communication module 44 allows the follower node to communicate with the leader node and the other follower nodes. In some embodiments, the communication module 44 is a wireless communication module. For example, the communication module 44 may comprise a wireless transceiver, such as a radio frequency (RF) transceiver, and a network stack. In one exemplary embodiment, the communication module 44 implements the network protocols for communicating messages throughout the network formed by the leader and follower nodes. An exemplary wireless communication module 44 is described in U.S. Provisional Patent Application No. 60/915,536, entitled "Wireless Communication Modules," and filed on May 2, 2007, which is hereby incorporated by reference. The data interface 46, such as a RS232 or USB port, allows the follower node to communicate with an external device, such as a personal computer.

Now, therefore, the following is claimed:

1. A system for reducing power consumption in a wireless mesh communication network, comprising:
    a plurality of follower nodes; and
    a leader node in communication with the plurality of follower nodes, the leader node being operable to transmit a sleep command to the plurality of follower nodes thereby causing the plurality of follower nodes to transition from an awake mode to a sleep mode, the leader node and the plurality of follower nodes consuming less power in the sleep mode than when in the awake mode, wherein the leader node is configured to synchronize, via the sleep command, a transition of the plurality of nodes from the awake mode to the sleep mode, wherein the sleep command is a multicast message, and wherein each of the plurality of follower nodes is operable to transition to the sleep mode in response to the sleep command without further communicating with the leader node prior to transitioning to the sleep mode, wherein the leader node is operable to transmit a notification to the plurality of follower nodes, the notification indicating when a transmission of a future sleep command is expected, wherein the plurality of followers nodes are operable to elect a new leader node if the leader node fails to transmit the future sleep command within a grace period of a time indicated by the notification for the transmission of the future sleep command.

2. The system of claim 1, wherein election of the new leader node is based on unique identifiers associated with the plurality of follower nodes.

3. The system of claim 1, wherein any one of the plurality of follower nodes can initiate an election of the new leader node.

4. The system of claim 1, wherein an election of the new leader node is initiated by one of the plurality of follower nodes nominating itself as the new leader node.

5. The system of claim 1, wherein an election of the new leader node is completed when each one of the plurality of follower nodes has performed a check to determine if it should be the new leader node and, if so, nominated itself as the new leader node.

6. The system of claim 1, wherein only a portion of the plurality of follower nodes periodically transition from the awake mode to the sleep mode.

7. A method of reducing power consumption in a wireless mesh communication network, comprising:
- communicating messages among a plurality of follower nodes;
- transitioning the plurality of follower nodes from an awake mode to a sleep mode, the plurality of follower nodes consuming less power when in the sleep mode than when in the awake mode;
- synchronizing the transitioning step by transmitting a sleep command from a leader node to the plurality of follower nodes, wherein the sleep command is a multicast message, wherein the transmitting comprises rebroadcasting the sleep command via at least one of the follower nodes, and wherein each of the follower nodes transitions from the awake mode to the sleep mode in response to the sleep command without further communicating with the leader node prior to transitioning to the sleep mode;
- transmitting a notification from the leader node to the plurality of follower nodes, the notification indicating when a transmission of a future sleep command is expected; and
- electing a new leader node if the leader node fails to transmit the future sleep command within a grace period of a time indicated by the notification for the transmission of the future sleep command.

8. The method of claim 7, wherein the electing is based on unique identifiers respectively associated with each of the plurality of follower nodes.

9. The method of claim 7, further comprising disabling at least one of the plurality of follower nodes from nominating itself as the new leader node before the electing.

10. The method of claim 7, further comprising reverting the new leader node back to a follower node in response to a sleep command.

11. The method of claim 7, wherein the sleep command transmitted from the leader node to the plurality of follower nodes includes a value for specifying a duration that each of the follower nodes is to remain in the sleep mode, and wherein the method further comprises scheduling, at each of the plurality of follower nodes, a transition from the sleep mode to the awake mode based on the value.

12. The system of claim 1, wherein the sleep command transmitted from the leader node to the plurality of follower nodes includes a value for specifying a duration that each of the plurality of follower nodes is to remain in the sleep mode, and wherein each of the plurality of follower nodes is configured to schedule an awakening from the sleep mode based on the value.

13. The system of claim 1, wherein each of the follower nodes has a control setting indicating whether the respective follower node is enabled to nominate itself as the new leader node, wherein the control setting of at least one of the follower nodes is set such that the at least one follower node is disabled for nominating itself as the new leader node.

14. The system of claim 1, wherein the new leader node is operable to revert back to a follower node in response to a sleep command.

* * * * *